United States Patent [19]

Patel et al.

[11] 4,228,126

[45] Oct. 14, 1980

[54] DIACETYLENE TIME-TEMPERATURE INDICATORS

[75] Inventors: Gordhanbhai N. Patel, Morris Plains; Kwok C. Yee, Randolph, both of N.J.

[73] Assignee: Allied Chemical Corporation, Morris Township, Morris County, N.J.

[21] Appl. No.: 854,933

[22] Filed: Nov. 25, 1977

[51] Int. Cl.$^2$ ............................................. G01N 21/06
[52] U.S. Cl. .................................. 422/56; 23/230 R; 116/206
[58] Field of Search ................. 23/230 R; 422/56, 57, 422/86; 116/114 AM, 116 V

[56] References Cited

U.S. PATENT DOCUMENTS

| | | | |
|---|---|---|---|
| 3,923,622 | 12/1975 | Baughman et al. | 260/666 PY |
| 3,999,946 | 12/1976 | Patel et al. | 23/253 TP |

OTHER PUBLICATIONS

Chimia, vol. 28 pp. 475–484 (1974 by Von G. Wegner).

*Primary Examiner*—R. E. Serwin
*Attorney, Agent, or Firm*—Robert A. Harman

[57] ABSTRACT

An improved recording device is described, useful for measuring the integrated time-temperature or integrated radiation-dosage history of an article, comprising a substrate onto which an acetylenic compound, containing at least two conjugated C≡C groups, in an inactive form, is deposited. The inactive form is capable of being converted by melt or solvent recrystallization to an active form, which undergoes 1,4-addition polymerization resulting in an irreversible, progressive color change. The color change produced at any given point in time represents an integrated time-temperature history of thermal annealing or integrated radiation-dosage history of exposure to actinic radiation to which an article has been exposed.

Also described is a process for producing an inactive form of the acetylenic compound. A film and a fiber, made from the inactive form of an acetylenic compound are also described.

8 Claims, 2 Drawing Figures

PUCNDO INACTIVE FORM

DIACETYLENE TIME-TEMPERATURE INDICATORS

BACKGROUND OF THE INVENTION

1. Field of the Invention

This invention relates to an improved device containing an inactive form of an acetylenic compound, having at least two conjugated C C groups, for measuring the integrated time-temperature history or integrated radiation-dosage history to which a perishable product has been exposed.

2. Brief Description of the Prior Art

Acetylenic compounds, containing at least two conjugated C≡C groups, being cyclic or acyclic, symmetrical or unsymmetrical, diynes, triynes, tetraynes or hexaynes, and hereinafter referred to as diacetylenes, are an extremely useful class of compounds. They undergo 1,4-addition polymerization in the solid state, upon exposure to thermal annealing or actinic radiation, including ultraviolet and gamma radiation, thereby resulting in highly colored polymers. Utilization of this class of compounds has been described in U.S. Pat. No. 3,923,622 (Baughman and Yee to Allied Chemical, 1975) for use as cyclically bound ladder polymers; U.S. Pat. No. 3,999,946 (Patel, Preziosi and Baughman, to Allied Chemical, 1976) for use as time-temperature history indicators; U.S. Application Ser. No. 775,150, for use as crosslinking agents; U.S. Pat. No. 4,125,534 and a divisional application thereof being U.S. Application Ser. No. 929,062, for use as thermochromic indicating materials and in indicia-display devices; U.S. Application Ser. No. 772,190, now U.S. Pat. No. 4,125,534, as new carbazole-type photoconductors and non-linear optical materials; U.S. Application Ser. No. 839,542, now abandoned, for use in gradient-type recording devices, and U.S. Application Ser. No. 817,069, as new co-crystallized compositions.

As described in U.S. Pat. No. 3,999,946 and U.S. Application Ser. No. 839,542, diacetylenes can be used in indicators wherein exposure of a diacetylene compound, deposited on a substrate, to thermal annealing or actinic radiation will initiate a 1,4-addition polymerization resulting in a color change. The color change product at any given point in time represents an integrated time-temperature history of thermal annealing or integrated exposure to actinic radiation.

The reference, U.S. Pat. No. 3,999,946, (see the sentence bridging columns 7 and 8; column 6, lines 16–19; column 7, lines 50–51) generally describes the preparation of the indicators by coating crystals of an active diacetylene compound onto a substrate which is then responsive to 1,4-addition polymerization. However, the prepared indicators have the disadvantage that they must be stored at low temperatures and protected from actinic radiation prior to use since the 1,4-addition polymerization process is initiated by thermal annealing or exposure to actinic radiation. The step of protecting the formed indicators, at low temperature during storage and shipping to the point of use, greatly increases the cost of production and introduces an element of uncertainty as to the reliability of the final readings of the devices after use.

What is needed is a device containing a form of diacetylene which can be stored at ambient temperatures during and after manufacture, shipped by standard procedures, and which can be applied to an article and activated by simple means just prior to use.

The above reference, U.S. Pat. No. 3,999,946, generally describes the use of active phases of diacetylenes which undergo an irreversible color change upon exposure to thermal annealing or actinic radiation. Techniques are also described for deactivating the active phase of a diacetylene after use, by adding an inhibitor, changing the temperature, or by applying a mechanical stress in order to decrease the thermal reactivity and permanently record the integrated time-temperature history obtained. It is disclosed that either an active or an inactive form of a given compound may be crystallized from a solvent, depending on the concentration (see column 9, lines 16–28). However, the reference does not describe or suggest the use of the inactive forms of diacetylenes in forming the indicator for use as an integrated time-temperature history indicator.

We have found that inactive and active forms of diacetylenes exhibit different X-ray diffraction patterns and the inactive form is incapable of undergoing 1,4-addition polymerization upon exposure to gamma radiation at room temperature or thermal annealing below its melting point.

Furthermore, we have found that inactive forms of diacetylenes can be coated on a substrate and converted to an active form prior to use by solvent or melt recrystallization processes. Thus, problems associated in storing and shipping the indicator prior to use, are eliminated.

SUMMARY OF THE INVENTION

In accordance with this invention there is provided an improved recording device including a substrate having deposited thereon at least one indicator, said indicator comprised of at least one acetylenic compound, containing at least two conjugated C≡C groups, capable of undergoing a 1,4-addition polymerization upon thermal annealing or exposure to actinic radiation, thereby undergoing an irreversible, progressive color change, wherein the color produced at any time during the color change represents an integrated time-temperature history of thermal annealing or integrated radiation-dosage history of exposure to actinic radiation, wherein the improvement comprises said acetylenic compound in an inactive form, positioned for exposure to the conditions to be recorded and capable of in situ conversion, by melt or solvent recrystallization, to an active form capable of undergoing 1,4-addition polymerization; wherein said active and inactive forms exhibit different X-ray crystallographic diffraction patterns and said inactive form being incapable of undergoing 1,4-addition polymerization upon exposure to gamma radiation at room temperature or thermal annealing below its melting point.

Also provided is a process for activating the device of this invention wherein the inactive form is converted to the active form by melt recrystallization comprising heating the inactive form above its melting point.

Further provided is a process for activating the device of this invention wherein the inactive form is converted to the active form by solvent recrystallization comprising contacting the inactive form with a solvent capable of converting the inactive form to an active form.

Also provided is a process for preparing an inactive form of a diacetylenic compound, substantially free of any active forms, comprising dissolving said diacetylenic compound in a solvent therefor, and precipitating said compound from the solution at a sufficiently greater rate than the rate of precipitation of an active form of said compound.

Further provided is a process for measuring the integrated time-temperature history of thermal annealing or integrated radiation-dosage history of exposure to actinic radiation, to which an article has been subjected, comprising applying the improved device of this invention to an article and converting the inactive form in situ to an active form by melt or solvent recrystallization.

In addition, there is also provided a film and a fiber made from an inactive form of a diacetylene capable of existing in both active and inactive forms.

A composition is also provided selected from the group consisting of the inactive forms of 2,4-hexadiyn-1,6-diol bis(p-methoxy-benzenesulfonate), N-carbazolyl-5,7-nonadiyn-1-ol phenylurethane and o,o'-diacetylenyldiphenyl glutarate.

DETAILED DESCRIPTION OF THE INVENTION AND PREFERRED EMBODIMENTS

Figure 1:
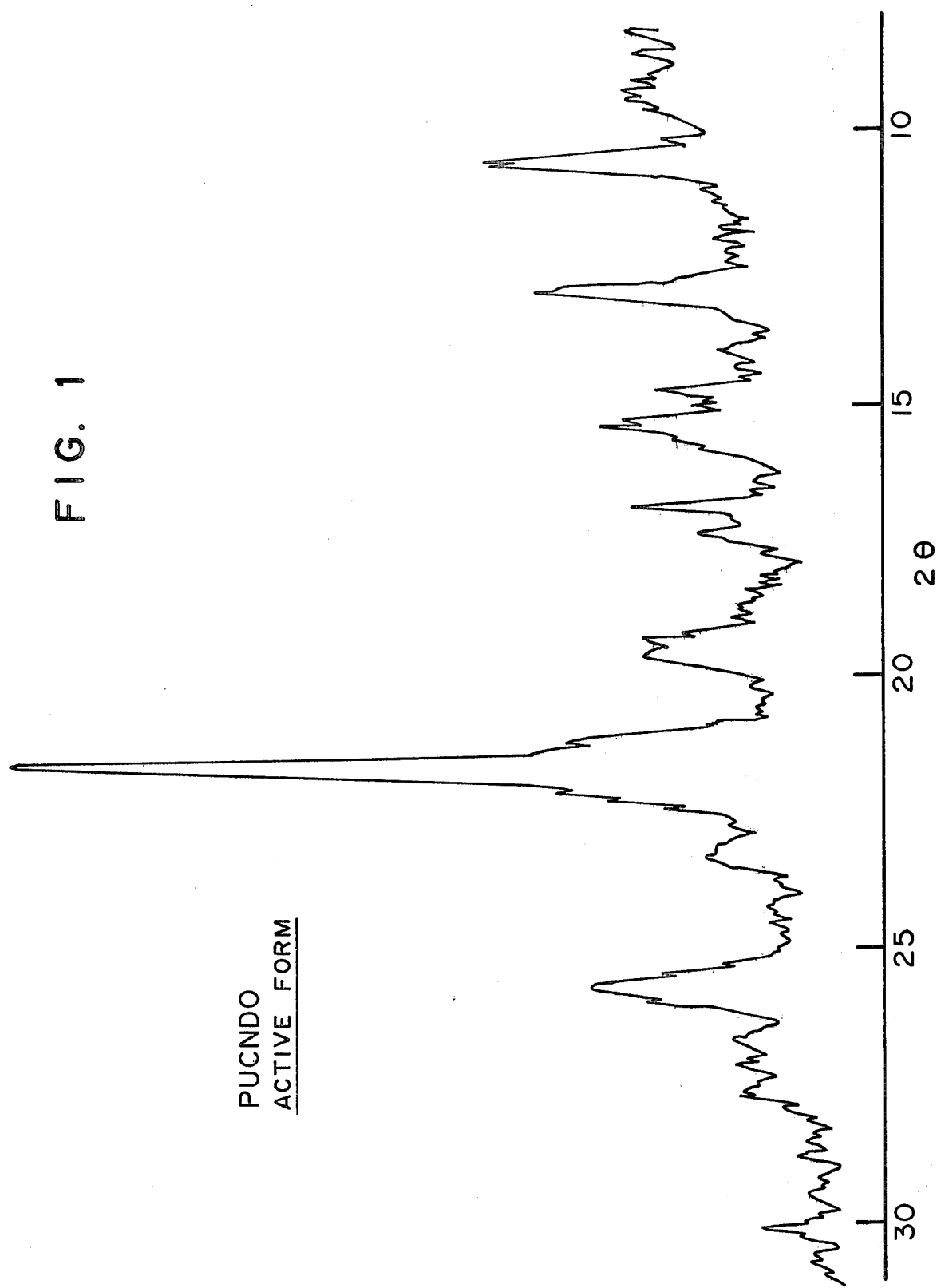
FIG. 1 is an X-ray powder diffraction pattern of the active form of crystalline 9-(N-carbazolyl)-5,7-nonadiyn-1-ol phenylurethane, referred to herein as PUCNDO.

We have discovered that an inactive form of a diacetylene can exist at ambient temperature and ambient light conditions for indefinitely long periods of time, and can be subjected to gamma radiation at room temperature or thermal annealing below its melting point, without being converted to an active form. The inactive form can be converted by solvent or melt recrystallization into an active form, which can undergo 1,4-addition polymerization under the above conditions, thus resulting in brightly colored polymer.

By taking advantage of this property, indicators containing an inactive form of diacetylene can be manufactured, stored and shipped under normal conditions without special resort to refrigerated and light-protected environments; and can be activated in situ for use when desired.

It is to be understood that several crystalline inactive and crystalline active forms of a diacetylene compound, of the same chemical composition, may exist. In such cases these inactive and active forms will exhibit the same general properties for "the active form" and "the inactive form", respectively, as described herein, and are included within the scope of this invention.

The inactive crystalline form of a diacetylene exhibits a different X-ray powder crystallographic diffraction pattern than the active form and generally has a melting point of about 5° C. lower than the active form. The X-ray data referred to herein are obtained from conventional techniques and melting point behavior is usually determined by a Fisher-Johns melting point apparatus or by differential scanning calorimetry.

Inactive forms of diacetylenes can generally be prepared by solvent recrystallization. In general, the inactive form of a diacetylene will be obtained from solution where very rapid precipitation conditions are employed. Typically, rapid precipitation will occur upon rapid cooling of the solution, rapid evaporation of the solvent, or adding the solution to another liquid which is miscible with the solvent, but acts as a non-solvent for the acetylenic compound.

A further subject of the invention is a process for producing an inactive form of a diacetylene comprising dissolving a diacetylene in a solvent therefor, and precipitating said compound from the solution at a rate sufficiently greater than the rate of precipitation of an active form of the compound so that substantially only the inactive form is obtained. In general, a solvent or a combination of solvents, is chosen such that the diacetylene recrystallizes rapidly from the solvent medium. For example, the inactive form of PUCNDO, 9-(N-carbazolyl)-5,7-nonadiyn-1-ol phenylurethane, is obtained when recrystallizing crude material from acetone and allowing the crystallization to occur rapidly; whereas the active form results when the recrystallization is allowed to proceed slowly.

In another example, the crystalline inactive form of the cyclic diacetylene, o,o'-diacetylenyldiphenyl glutarate (DADPG), is obtained by rapid cooling of a (10:90) acetone/petroleum ether (b.p. 60°–110° C.) solution, at a concentration of 0.007 g/ml at room temperature, with an ice-water bath. The inactive form of DADPG is not solid state polymerizable with gamma-radiation. Alternately, the active form of DADPG is obtained by slow solvent evaporation of a 10:90 acetone/petroleum ether solution, at the same concentration, at room temperature. The active form is polymerizable upon exposure to gamma radiation. The crystalline inactive form melts at 133°–134° C., about 10° C. lower than the active form. However, elemental analyses show that both active and inactive forms have the same compositions. X-ray diffraction studies show that both the inactive and active forms are monoclinic, but differ in the space group and lattice parameters. Calculations of the density from the lattice parameters show that the calculated density of the inactive form, (1.31 g/cm$^3$), is about 10% smaller than that calculated for the active form, (1.41 g/cm$^3$). These findings indicate that the monomer molecule packing in the active form is much closer than in the inactive form, in agreement with the observed polymerizability in the solid state.

The inactive form of a diacetylene can be converted to the active form by heating the inactive form above its melting point, from about 1° to 20° C. above the melting point, and cooling the melt to room temperature. For example, the inactive form (colorless needles) of DADPG is heated to 150° C., above the melting point, and rapidly cooled to 25° C., resulting in an active form as red solids. Thermal analyses of the melting process (DSC) show a strong endotherm at 134° C. and a very weak endotherm at 140° C. resulting from the initial heating of the crystalline inactive form of DADPG from 25° C. to 150° C. at a heating rate of 5° C./min. When the sample is cooled to 25° C. and reheated to 150° C., only a strong endotherm at 140° C. is noted. These observations clearly demonstrate that a physical change in form has occurred and that the change is irreversible. By heating the inactive form at a temperature up to about 20° C. above its melting point, preferably 5° to 15° C. above its melting point, and allowing to cool to room temperature (25° C.), the active form will generally be obtained. The process of activating an indicator containing an inactive diacetylene, based on a melt recrystallization process, is also a subject of this invention.

The inactive form can also be prepared by spraying a solution of a diacetylene onto a substrate and allowing the solvent to evaporate rapidly. For example, spraying an acetone or tetrahydrofuran solution of HDDPU, 2,4-hexadiyn-1,6-diol bis(phenylurethane), onto filter paper or aluminum foil, and allowing the solvent to evaporate rapidly, for example, by passing a stream of air over the surface, results in the inactive form. Formation of the inactive form on aluminum foil can be assisted, during the spraying process, by applying a thin coating of paraffin oil to the aluminum foil. The reason why the paraffin coating assists the formation of the inactive form is not clearly understood.

Conversion of the inactive form to an active form prior to use, can also be accomplished, in addition to melt recrystallization, by contacting the indicator strip, containing the inactive form, with a recrystallization solvent. For example, the above-discussed inactive form of HDDPU can be converted to the active form by spraying acetone onto the inactive form and allowing the solvent to evaporate slowly at room temperature.

Solvents, which are capable of converting an inactive form of diacetylene to an active form, are adequately described in U.S. Pat. No. 3,999,946, column 6, lines 16–26, which describes a series of solvents for use in producing various active diacetylenes. Suitable solvents include for example, alkyl esters of monocarboxylic acids, alkyl alcohols, paraffins, olefins, benzene, alkylated benzenes, ethers, ketones, petroleum ethers, halogenated hydrocarbons and water. Particularly useful crystallizing solvents are 1,2-dimethoxyethane, petroleum ether, acetone, chloroform, benzene, methanol, ethanol, ethyl acetate, water, tetrahydrofuran and p-dioxane.

Diacetylene compounds, which are applicable in the invention, are also adequately described in U.S. Pat. No. 3,999,946. Generally, cyclic or acyclic diacetylenes, containing at least two conjugated C≡C groups, are applicable in the invention including symmetrically or unsymmetrically substituted diynes, triynes, tetraynes and hexaynes. In addition, mixtures of diacetylenes or co-crystallized compositions of diacetylenes, as described in U.S. Application Ser. No. 817,069, can be employed. In the simplest case, diacetylenes are of the form R—C≡C—C≡C—R', where R or R' can be the same or different substituent groups. Examples of R or R' groups include alkyl, aryl, benzoate, sulfonate, urethane, acid, alcohol, carbazolyl and the like. Preferred acetylenic compounds include diynes, triynes, tetraynes and hexaynes. Preferred derivatives include mono and bisulfonates, mono and bisurethanes, mono and bisacids, mono and bisalcohols, and mono and bis carbazolyl derivatives of acetylenic compounds. Such preferred compounds, and derivatives thereof, are most useful as integrated time-temperature history or integrated radiation-dosage history indicators over the time and temperatures likely to be experienced by commercial, perishable products. Examples of acetylenic compounds useful as indicators in the device of this invention include

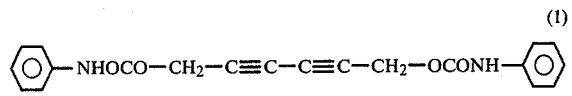

2,4-hexadiyn-1,6-diol bis(phenylurethane), HDDPU

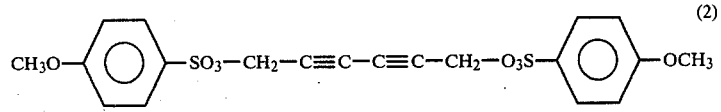

2,4-hexadiyn-1,6-diol bis(p-methoxybenzene sulfonate), PMOBS

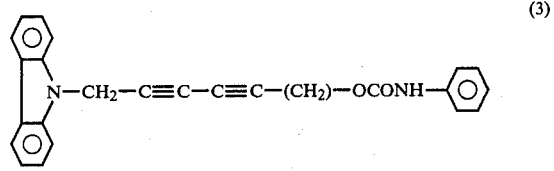

9-(N-carbazolyl)-5,7-nonadiyn-1-ol phenylurethane, PUCNDO

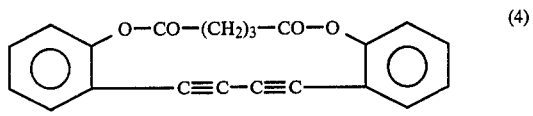

o,o'-diacetylenyldiphenyl glutarate, DADPG.

Methods of preparation of diacetylenes applicable in this invention, including starting materials and synthetic procedures are adequately described in U.S. Pat. No. 3,999,946.

One embodiment of the device of this invention comprises a substrate having deposited thereon an indicator containing at least one diacetylene compound, in an inactive crystalline form, which is converted to an active form by melt recrystallization, above its melting point.

The substrate of the device can be any material which does not chemically interfere with device operation and provides sufficient rigid support for the inactive form of the diacetylene compound deposited thereon. Included among representative example of substrates are filter paper, aluminum foil, plastic, glasses and the like. The back of the substrate, in addition, may also be coated with an adhesive to secure the device to the article being monitored.

The substrate can optionally be covered with a suitable packaging material, such as a plastic or polymer film which does not chemically interfere with device operation and which is transparent allowing for convenient visual inspection of the device during usage. Representative examples of packaging materials are transparent polyethylene, polypropylene, polyethylene terephthalate and the like.

The indicator containing the inactive form of the diacetylene may also contain a binder material such as an epoxy glue, lacquer or shellac to adhere the diacetylene crystals into a suitable medium to be placed onto the substrate.

The device can be suitably activated, prior to use, by placing the device onto the article to be monitored and converting the inactive form to the active form by a blast of hot air, or by hot pressing, followed by rapid cooling to ambient temperature. A convenient method of activation can be supplied with a conventional high wattage, hot air gun, having high temperature and low temperature settings.

Various modifications of the basic device can be made by one skilled in the art without departing from the scope and spirit of the instant invention.

A further embodiment of the device is where the device contains an indicator strip containing an inactive form of a diacetylene which is activated prior to use by solvent recrystallization. The solvent applicable in this embodiment is one which is capable of converting an inactive form of diacetylene to an active form and in general, is chosen from the solvents described above for recrystallizing diacetylenes. Preferred solvents in this embodiment are acetone, tetrahydrofuran and p-dioxane.

The composition of the substrate and indicator are the same as discussed above for the melt device.

A process for measuring the integrated time-temperature history of thermal annealing or integrated radiation-dosage history of exposure to actinic radiation, to which an article has been subjected, is also a subject of this invention, and comprises applying the device of this invention to an article and converting the inactive crystalline form to an active crystalline form by melt or solvent recrystallization.

It has been found that by heating an inactive form at its melting point, or slightly above, and drawing the melted material into a film upon slow cooling, the active phase is formed resulting in a film, which is strongly dichroic with high brilliance and controlled desired thickness. The advantage for film growth from the inactive form is that the melt obtained from an inactive form contains only monomer molecules while the melt obtained from an active form by conventional methods contains monomers, dimers, trimers and the like. Consequently, uniform and aligned films of diacetylenes can be obtained from the melts of the inactive forms. For example, films made from the inactive forms of PUCNDO and DADPG exhibit high brilliancy and are useful in this form as integrated time-temperature history and integrated radiation-dosage indicators. Other applications for such films include polarizers, and polarizing reflectors.

Thus, another embodiment of this invention is a film made from an inactive form of a diacetylene.

In another embodiment of this invention, the unique phase transformation of inactive to active form can be utilized in a process for making continuous polydiacetylene fibers. In this process, the inactive form diacetylene is melted above its melting point. The melt is then spun or extruded at appropriate temperatures and rates such that simultaneous crystallization (into the active form) and polymerization of the resulting active form can be achieved. The resulting continuous polydiacetylene fibers, which may be just partially polymerized, can be fully polymerized by thermal annealing or exposure to high energy irradiation. For example, the inactive form crystalline powder of PUCNDO is packed in a capillary tube (Kimble Product, KIMAX-51, 1.5 mm in diameter and 90 mm in length) and sealed under atmospheric pressure. The inactive form powder inside the capillary tube is instantly melted at 141° C. with a silicon oil bath. After the melting, the melt inside the capillary tube is kept immersed in the bath. The bath temperature is slowly lowered to 115° C. from 141° C., within 30 minutes, and maintained at 115° C. an additional 14 hrs. At this stage, the melt has solidified as long red crystalline fibers, which are strongly dichroic towards polarized light. These fibers whose chain directions are parallel to the capillary tube are useful in this form as integrated time-temperature history and integrated radiation-dosage indicators.

Alternately, the indicator strip of the device of this invention can be prepared by heating an inactive form of a diacetylene on a substrate, drawing it into a film, and rapidly quenching to room temperature, thereby forming a uniform film of the inactive phase. This provides the production of a very uniform coating of the inactive phase of the diacetylene on the substrate.

The following examples are illustrative of the best mode of carrying out the invention, as contemplated by us, and should not be construed as being limitations on the scope and spirit of the invention.

EXAMPLE 1

One gram of the diacetylene, 2,4-hexadiyn-1,6-diol bis(phenylurethane), HDDPU, was dissolved in 10 ml of acetone containing 2 ml of laquer, and the solution sprayed onto filter paper. After acetone solvent was rapidly evaporated under a moderately fast stream of nitrogen gas, the deposited HDDPU was in a colorless form. This form was inactive: it did not show any coloration even after 1 month. The inactive form was converted to an active form by heating the compound in an oil bath at 155° C., causing it to melt. Rapid cooling to room temperature by removal from the oil bath resulted in the active form which turned completely red within one day at room temperature.

EXAMPLE 2

A solution containing 0.9 gram of 2,4-hexadiyn-1,6-diol bis(phenyl urethane), HDDPU, and 0.1 gram of 2,4-hexadiyn-1,6-diol bis(p-chlorophenyl urethane), HDDPCPU, was prepared in 10 ml of acetone. The solution was poured into cold hexane at $-70°$ C., under vigorous stirring. A white precipitate of co-crystallized HDDPU and HDDPCPU was obtained. The precipitate was filtered off and dried under vacuum. The dried precipitate was inactive: it did not show any noticeable coloration at room temperature even after a month. Contacting the white precipitate with a small amount of acetone or tetrahydrofuran resulted in a highly active form which turned reddish violet within 24 hours at room temperature. When the solution of HDDPU and HDDPCPU, described above, was poured into hexane at room temperature, a highly active form of co-crystallized HDDPU and HDDPCPU was obtained. The precipitate turned red within a minute.

EXAMPLE 3

A solution of 0.9 grams HDDPU and 0.1 grams 2,4-hexadiyn-1,6-diol bis(p-chlorophenylurethane), in 10 ml of acetone, containing 2 ml of lacquer, was sprayed onto aluminum foil (coated lightly with paraffin oil) followed by rapid evaporation of acetone solvent under a moderately fast stream of nitrogen gas, to obtain a co-crystallized colorless composition. The composition was inactive: it did not show any coloration at 120° C. after 1 day. The composition was sprayed with acetone, the acetone allowed to evaporate slowly by merely standing at room temperature, resulting in an active form which turned red at room temperature within a day and metallic green-gold in two days at 120° C.

EXAMPLE 4

One gram of HDDPU was dissolved in 20 ml of tetrahydrofuran and 7 ml of hexane was added dropwise under continuous stirring resulting in a slightly cloudy mixture. The resulting suspension was then sprayed onto a 4"×4", No. 1 piece of Whatman filter paper. After rapid evaporation of solvent under a moderately fast stream of nitrogen gas, colorless HDDPU was obtained.

The filter paper, coated with this HDDPU precipitate, was cut into two 2" strips and one strip was sprayed with p-dioxane solvent and the solvent was evaporated slowly by standing at room temperature. The strips, one containing the original preparation, and the other the preparation recrystallized from p-dioxane, were then allowed to stand at room temperature, 25° C., protected from light, and comparisons of the color development of each strip were made over a 28 day period and are tabulated below in Table 1. The color produced in each case is expressed in well known Munsell ® values, wherein the color value, 5 PB 5/10, is pinkish-blue.

TABLE 1

| Time of Exposure at 25° C. | Original Preparation | Recrystallized Preparation |
|---|---|---|
| 0 | colorless | colorless |
| 0.25 days | " | 2.5 PB 8/4 |
| 0.75 days | " | 5 PB 8/6 |
| 2 days | " | 5 PB 7/8 |
| 4 days | " | 5 PB 6/10 |
| 8 days | " | 5 PB 5/10 |
| 15 days | " | 5 PB 5/10 |
| 28 days | " | 5 PB 5/10 |

As is seen from the above example, the original preparation of HDDPU was an inactive form which remained virtually colorless during the total time of exposure, whereas the preparation recrystallized slowly from p-dioxane was an active form which developed a significant red color in 0.25 days.

EXAMPLE 5

The above-described strip of filter paper in Example 4, containing the inactive form of HDDPU deposited thereon, can be used as a device for measuring integrated time-temperature history.

The device is affixed to a perishable article, having a shelf life of about 8 days at 25° C., at the beginning of the monitoring period. The inactive form of diacetylene is sprayed or contacted with a small amount of acetone solvent, the solvent is allowed to slowly dry, in about 10 minutes, by standing at room temperature. The inactive form is completely converted to the active form and the indicator begins to turn a pinkish color upon exposure to the thermal environment at 25° C. After 8 days of exposure at about 25° C., the color has reached a reddish-blue hue, which can be compared to a standard color having a Munsell value of 5 PB 5/10. Thus, the device indicates when an integrated time-temperature history equivalent to an 8 day exposure at 25° C. has elapsed for the perishable article.

EXAMPLE 6

1. Synthesis of PUCNDO

To a 100 ml, 3 necked flask, fitted with mechanical stirrer, addition funnel, thermometer and reflux condensor, was charged at room temperature, 3.6 grams (0.012 mol) 9-(N-carbazolyl)-5,7-nonadiyn-1-ol (synthesis of this compound has been described in U.S. Application No. 772,190), 10 ml 1,2-dimethoxyethane (glyme) 0.1 gram dibutyltin-di-(2-ethyl) hexanoate, and 1 ml triethylamine, under a nitrogen atmosphere. To the stirred mixture, was added a solution of 2.2 grams (0.018 mol) phenylisocyanate and 10 ml glyme in one portion. The reaction temperature rose to 35° C. in about 5 minutes and then subsided to 25° C. The reaction mixture was stirred at 45° C. for an additional 3 hours and then cooled to room temperature. Heptane, 80 ml, was added in one portion, resulting in a white precipitate. The precipitate was collected by filtration and washed with heptane and petroleum ether. Obtained was 4.1 grams of a white solid, representing an 82% yield of theory of PUCNDO possessing a melting point of 123.5° to 124.5° C.

2. Active and Inactive Forms

Recrystallization of the above obtained solid from acetone yielded two crystal forms of PUCNDO: A, white platelets, having a melting point of 124.5° to 125° C., which were inactive towards 1,4-addition polymerization upon exposure to a total of 50 Mrads of gamma radiation; and B, red needles, having a melting point of about 145° C., which evidenced a color change to metallic green-gold upon exposure to a total of 50 Mrads of gamma radiation. A is an inactive form and B is an active form of PUCNDO.

Elemental analysis of both compounds showed that they both were of the same empirical formula, calculated for the formula $C_{28}H_{24}N_2O_2$; % C (calculated) 79.98; % H 5.75 (calculated); for A, % C (found) 79.93, % H (found) 5.81; for B, % C (found) 79.96, % H (found) 5.59.

Figure 2:
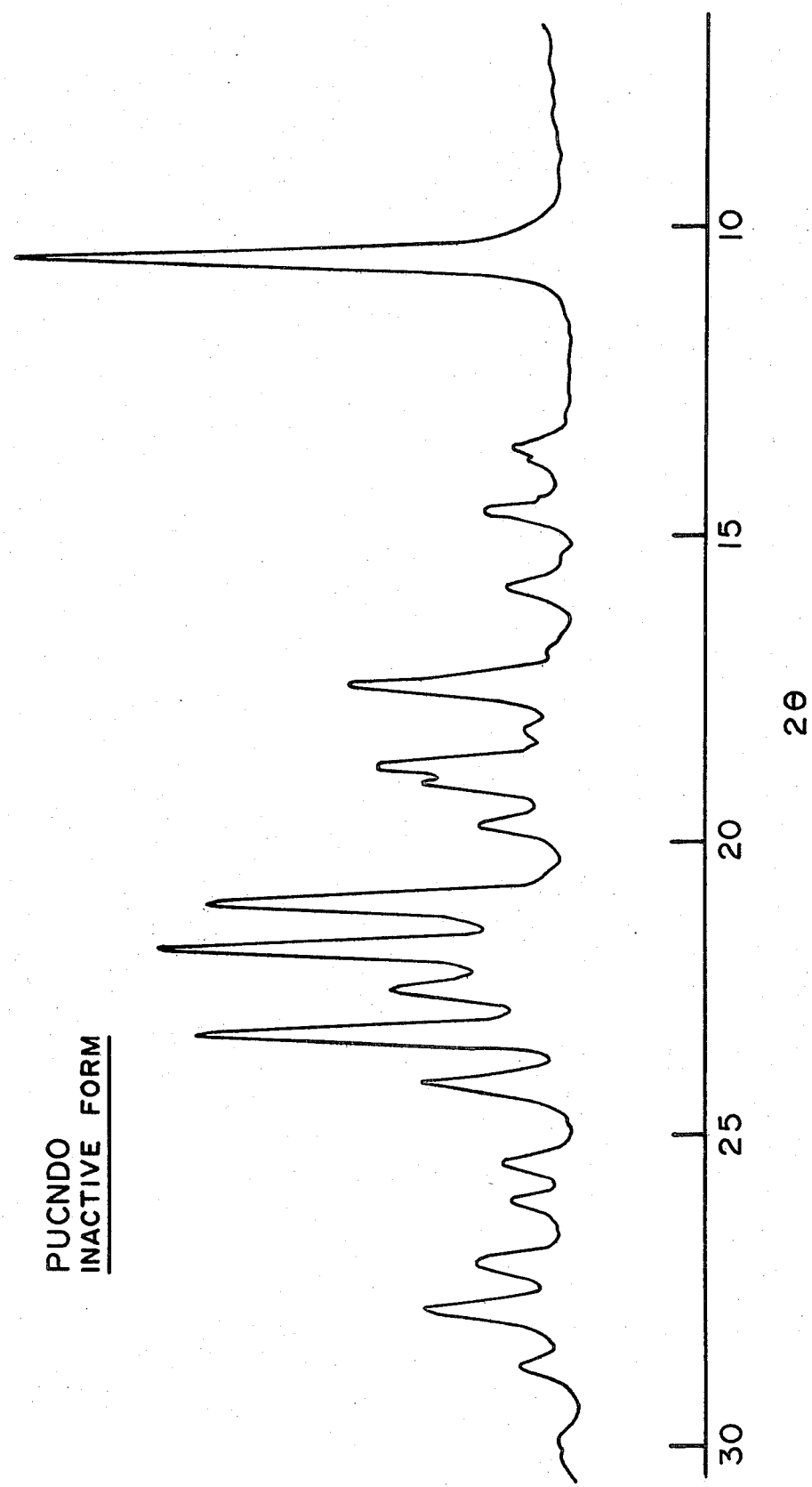
FIG. 2 is an X-ray powder diffraction pattern of an inactive form of crystalline PUCNDO.

FIGS. 2 and 1 illustrate the X-ray powder diffraction patterns for the inactive form A and the active form B, respectively, showing that they exist in separate and distinct crystalline forms.

3. Conversion

It was found that by heating the inactive white platelets at a temperature of about 127° C. a melt was formed, which then slowly cooled allowing to stand at room temperature, resulted in the active form B.

4. Film Formation

The inactive form was heated at a temperature of 143° C. and drawn into a thin film of 0.01 mm thickness. The film exhibited dichroic properties.

EXAMPLE 7

1. Synthesis of DADPG

A. o-Hydroxyphenylacetylene (I)

A 500 ml., three-necked, round-bottomed flask equipped with a thermometer, magnetic stirring bar, reflux condenser, and means for providing a nitrogen atmosphere was charged with a solution of 2,3-benzofuran, 19.0 g. (0.161 mole) in 190 ml. (186 g., 2.35 mole) of pyridine. The reaction system was purged with nitrogen and kept under nitrogen atmosphere throughout the course of reaction. Then freshly cut sodium metal, 11.3 g. (0.490 mole), was added, and the mixture was stirred magnetically and heated with a silicon-oil bath at 190° (reaction mixture temperature 117°) for 4 hours. After cooling to room temperature, the black reaction mixture was treated by successive dropwise addition of 100 ml. of pyridine, 50 ml. of 50% (v/v) pyridine-water, and 100 ml. of water. The resulting red-brown reaction mixture was extracted with 400 ml. of ether. The pyridine-water layer was acidified with excess (750 ml.) of 6 N HCl solution, while the reaction temperature was kept between 20°-30° with an ice-water bath. The acidified mixture was extracted with four 300 ml.-portions of ether. The combined ethereal extracts were washed with 200 ml of 6 N HCl solution and three 200 ml.-portions of water, dried over $MgSO_4$ and concentrated to give 15.3 g. of yellow-brown oil, which was further purified by distillation via a 5" Vigreux column giving rise to 11.7 g. (62% yield) of colorless product, $bp_{12mm}$ 72°-73°.

B. Bis(o-ethynylphenyl) Glutarate (II)

A 500-ml., three-necked, round-bottomed flask equipped with a thermometer and mechanical stirrer was charged with a solution of potassium hydroxide, 39 g. (0.700 mole) in 360 ml. of water and then 11.7 g. (0.100 mole) of o-hydroxyphenyl acetylene (I) was added. The resulting mixture was stirred vigorously and cooled with an ice-water bath to a temperature of 10°, and then 34 g. (0.200 mole) of glutaryl chloride was added over a period of about 5 minutes. The temperature of the reaction mixture rose to 34° and subsided. After stirring at 10° C. for an additional 1.5 hours, the reaction mixture was extracted with four 200 ml-portions of ether. The combined ethereal extracts were washed with 200 ml. of 10% potassium hydroxide solution and two 200 ml-portions of water, dried, and concentrated in vacuo to give 13.0 g. (78% yield) of the desired product.

C. o,o'-Diacetylenyldiphenyl Glutarate (III)

A 2-l., three-necked, round-bottomed flask equipped with a thermometer, mechanical stirrer, and reflux condenser was charged with 900 ml. of pyridine, 104 g. (0.520 mole) of cupric acetate monohydrate, and 13.0 g. (0.039 mole) of bis(o-ethynylphenyl) glutarate (II). The resulting mixture was stirred and heated at 50° for 4 hours, and then cooled to room temperature. The resulting precipitate was removed by filtration. The filtrate was concentrated to give a dark residue which was extracted with four 300 ml-portions of ether. The combined ethereal extracts were washed with two 200 ml-portions of saturated aqueous cupric acetate solution and two 200 ml-portions of water, dried, and concentrated to a volume of about 200 ml. The solution was then allowed to evaporate slowly at room temperature. When the solution had reduced to a volume of about 100 ml., the colorless needle crystals precipitated out were removed by filtration. The residue obtained via concentration of the filtrate was washed with 50 ml. of absolute ethanol to give 3.8 g. of brown solid. Recrystallization of all the brown solid from 200 ml. of 50% acetone/petroleum ether (bp. 60°-110°) by slow evaporation at room temperature gave 2.7 g. (21% yield) of large colorless, platelike crystals which changed to pink upon light exposure.

2. Inactive Form

Recrystallizing the above brown solid from a 10% acetone/petroleum ether (60°-110°) solution at a concentration of 0.005-0.010 grams/ml, followed by rapid cooling with an ice-water bath, resulted in an inactive form, as colorless, needle-like crystals, melting point 133°-134° C. Analysis of the solid for the formula $C_{21}H_{14}O_4$ revealed: %C (calculated) 76.36, found 75.58; %H (calculated), 4.27, found 4.51. The density of the crystalline solid was calculated to be 1.31 grams per $cm^3$ derived from experimentally determined lattice parameters from X-ray analysis. This form was inactive towards 1,4-addition polymerization upon the application of mechanical stress at 20,000 psi for several minutes, and upon exposure for several days, to ultraviolet, visible radiation and about 50 Mrads of gamma radiation (at a dosage rate of about 1 Mrad/hr.)

3. Active Form

Recrystallization of the above brown solid from 10% acetone/petroleum ether (boiling point 60° to 110° C.) at a concentration of 0.001-0.005 grams/ml, by slow evaporation at room temperature, yielded an active form having a melting point of 142°-143° C. Analysis of the solid for the formula $C_{21}H_{14}O_4$ revealed: %C (calculated) 76.36, found, 76.33; %H (calculated) 4.27, found 4.46. The density of the solid was calculated to be 1.41 grams per $cm^3$ derived from experimentally determined lattice parameters as obtained from X-ray analysis. A density measurement yielded an observed value of 1.35 grams per $cm^3$. This form was active toward 1,4-addition polymerization forming a red colored polymer upon exposure to 45 Mrad of gamma radiation (at a dosage rate of about 1 Mrad/hr.).

4. Conversion

The inactive form, when heated at a temperature of 140°-150° C., followed by slow cooling to room temperature, was converted to the active form.

EXAMPLE 8

1. Synthesis of PMOBS (2,4-hexadiyn-1,6-diol bis(p-methoxybenzene sulfonate)

Fifty grams of p-methoxybenzenesulfonyl chloride was reacted, at 15° to 18° C., with 11 grams of 2,4-hexadiyn-1,6-diol in 100 ml tetrahydrofuran, while a solution of 20 grams potassium hydroxide in 180 ml water was added dropwise over a 10 minute period. The resulting exothermic reaction was cooled at 15° to 18° C. with the aid of an ice-water bath. After the addition of the potassium hydroxide solution, the solution was allowed to stir overnight at room temperature. The mixture was then poured into 500 ml cold aqueous sodium chloride solution which resulted in a yellow precipitate. The precipitate was collected by filtration, washed with water and dried. Obtained was 41.6 grams (93% yield of theory) of a yellow brown solid, melting point 120° to 122° C.

2. Conversion

The obtained yellow brown solid was recrystallized from ethanol yielding yellow crystals melting point 121° to 123° C. The yellow crystals were inactive to 1,4-addition polymerization upon exposure to 50 Mrads of gamma radiation, at a dosage rate of 1 Mrad/Hr.

Heating the yellow solids, above its melting point of 123° C., and slowly cooling the melt to room temperature, produced an active form, a solid which turned blue color upon standing at room temperature for 1 day.

EXAMPLE 9

A device based on activation by melt recrystallization, is prepared from PMOBS. Inactive crystals of PMOBS, prepared by recrystallization from ethanol, are mixed with lacquer and coated on a strip of filter paper and allowed to dry. The filter paper containing the deposited diacetylene is now a device of this invention. The device is heated with a hot air gun to 123° C., wherein the diacetylene melts, and is slowly allowed to cool to room temperature, by standing. The process requires about 10 to 20 minutes totally. The device is then affixed to a perishable article having a shelf life of about 1 day at room temperature. After exposure at room temperature (25° C.) for one day, the device will have turned blue, indicating that the shelf life of the perishable article has expired.

We claim:

1. In a recording device including a substrate having deposited thereon at least one indicator, said indicator comprised of at least one acetylenic compound, containing two conjugated C≡C groups, capable of undergoing a 1,4-addition polymerization upon thermal annealing or exposure to actinic radiation, thereby undergoing an irreversible, progressive color change, wherein the color produced at any time during the color change represents an integrated time-temperature history of thermal annealing or integrated radiation-dosage history of exposure to actinic radiation, the improvement which comprises said acetylenic compound in an inactive form, positioned for exposure to the conditions to be recorded and capable of in situ conversion, by melt or solvent recrystallization, to an active form capable of undergoing 1,4-addition polymerization; wherein said active and inactive forms exhibit different X-ray crystallographic diffraction patterns, and said inactive form being incapable of undergoing 1,4-addition polymerization upon exposure to gamma radiation at room temperature or thermal annealing below its melting point.

2. The device of claim 1 wherein the acetylenic compound is 2,4-hexadiyn-1,6-diol bis(phenylurethane), 2,4-hexadiyn-1,6-diol bis(p-methoxybenzenesulfonate), 9-(N-carbazolyl)-5,7-nonadiyn-1-ol phenylurethane, or o,o'-diacetylenyldiphenyl glutarate.

3. The device of claim 1 wherein the acetylenic compound is a co-crystallized acetylenic composition.

4. A process for activating the device of claim 1, wherein the inactive form is converted to the active form by melt recrystallization comprising heating the inactive form above its melting point.

5. A process for activating the device of claim 1, wherein the inactive form is converted to the active form by solvent recrystallization comprising contacting the inactive form with a solvent capable of converting the inactive form to an active form.

6. The process of claim 5 wherein the solvent is an alkyl ester of a monocarboxylic acid, alkyl alcohol, paraffin, olefin, benzene, alkylated benzene, ether, ketone, petroleum ether, halogenated hydrocarbon or water.

7. The process of claim 6 wherein the solvent is acetone, tetrahydrofuran or p-dioxane.

8. A process for measuring the integrated time-temperature history of thermal annealing or integrated radiation-dosage history of exposure to actinic radiation, to which an article has been subjected, comprising applying the device of claim 1 to said article and converting the inactive form in situ to an active form by melt or solvent recrystallization.

* * * * *